United States Patent [19]

Bellows

[11] Patent Number: 4,830,320

[45] Date of Patent: May 16, 1989

[54] DEVICE FOR SUPPORTING AND STABILIZING AN ARTICLE OF FURNITURE

[76] Inventor: Robert K. Bellows, 1603 Spruce, Boulder, Colo. 80302

[21] Appl. No.: 48,075

[22] Filed: May 11, 1987

[51] Int. Cl.$^4$ ............................................. F16M 11/24
[52] U.S. Cl. ................................... 248/188.2; 254/104
[58] Field of Search ...................... 248/188.2, 649, 669, 248/354.1; 254/104, 89; 52/126.1; 182/200; 180/200, 41

[56] References Cited

U.S. PATENT DOCUMENTS

| | | | |
|---|---|---|---|
| 1,045,984 | 12/1912 | King | 254/104 |
| 1,901,287 | 3/1933 | Corriveau | 254/104 X |
| 2,709,571 | 5/1955 | Mafera | 248/188.2 X |
| 2,819,037 | 1/1958 | Wilkin | 248/188.2 X |
| 3,030,730 | 4/1962 | Costar | 248/188.2 |
| 3,684,233 | 8/1972 | Vukich | 248/188.2 X |
| 4,135,335 | 1/1979 | Jensen | 254/104 X |
| 4,625,489 | 12/1986 | Bogle | 52/126.1 X |

FOREIGN PATENT DOCUMENTS 2516129 12/1975 Fed. Rep. of Germany ... 248/188.2

*Primary Examiner*—J. Franklin Foss
*Attorney, Agent, or Firm*—Timothy J. Martin

[57] ABSTRACT

A device adapted to stabilize an article of furniture on a support surface is formed as a wedge-shaped main body having upper and lower surfaces diverging from a common vertex to an end surface. A plurality of transverse rib teeth are on at least one of, but preferably both of, the upper and lower surfaces so that a plurality of devices may be stacked with the teeth preventing longitudinal slippage. The construction material is stiff, yet flexible and resilient, to help stabilize the article of furniture, and may be an anti-skid material. A cavity may be provided to enhance selected flexing, and ridges may be provided to prevent lateral slippage. The upper and lower surfaces have a common radius of curvature and may be planar or, respectively, convex and concave. The upper and lower surfaces may come together at a point, a line or a blunt nose to define the vertex. A bore may be formed through the body member for mounting and carriage.

25 Claims, 3 Drawing Sheets

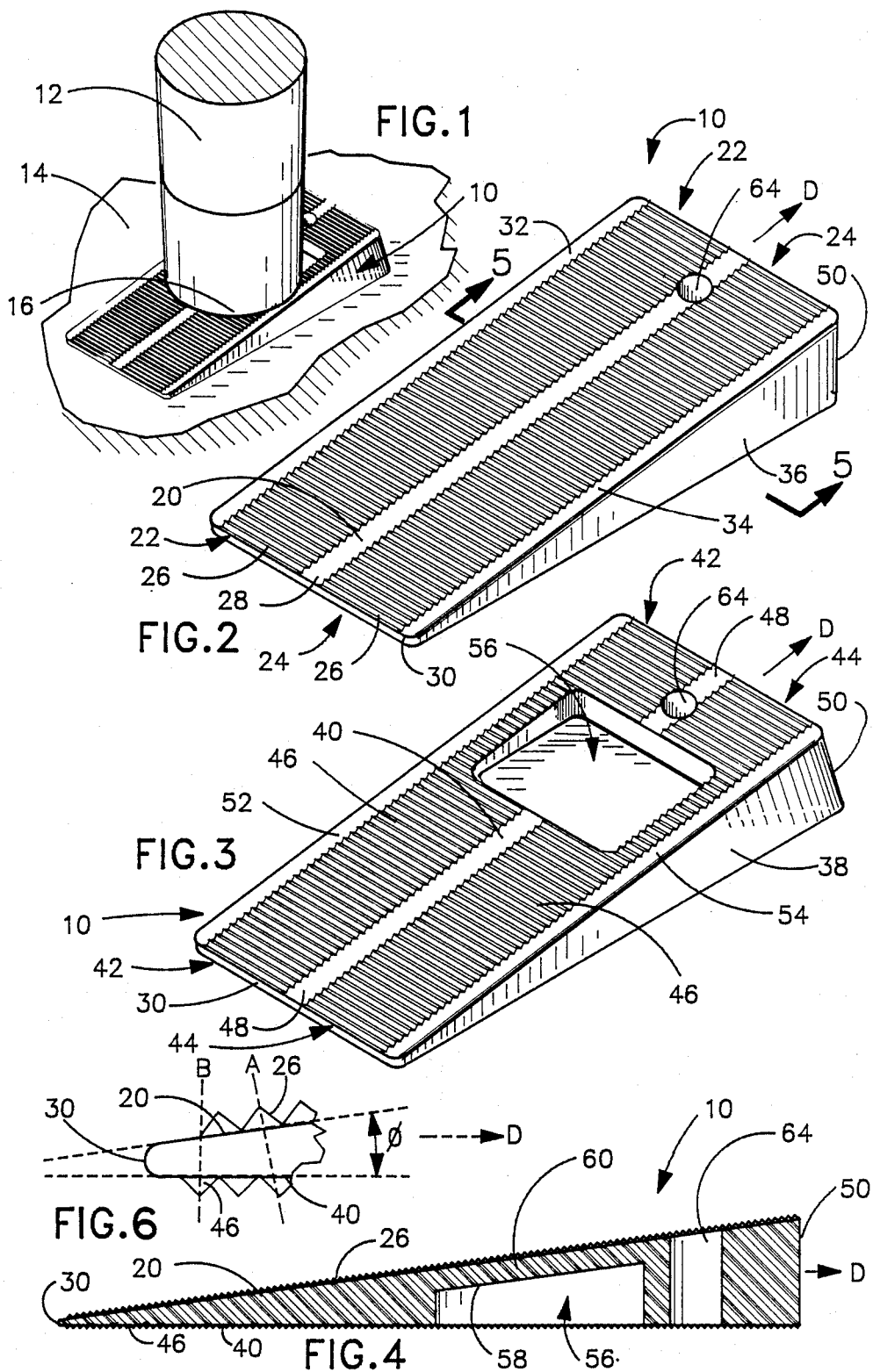

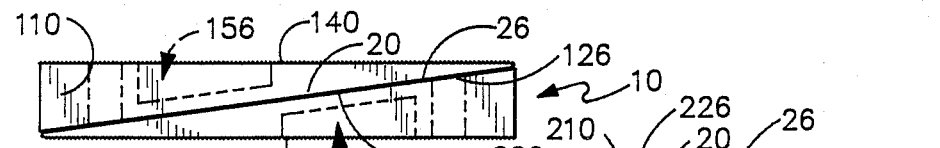
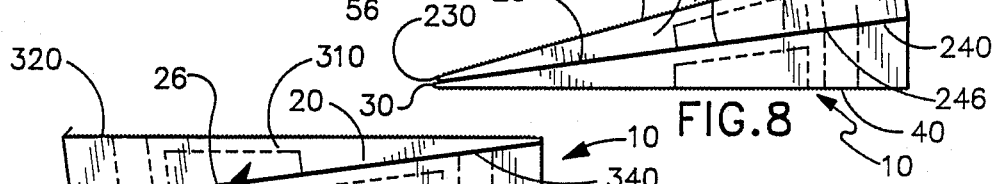
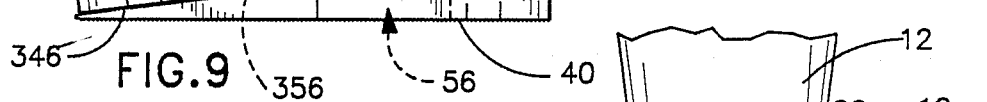
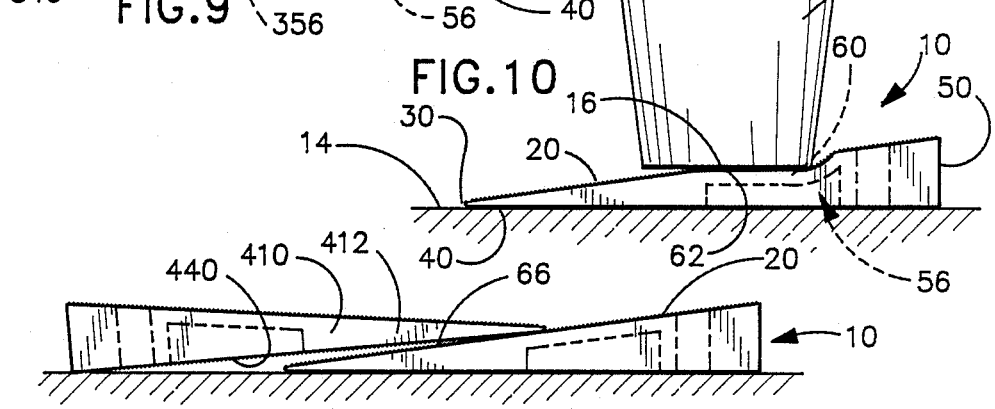
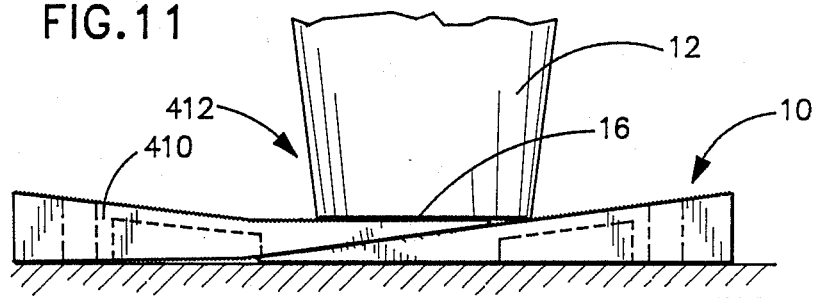
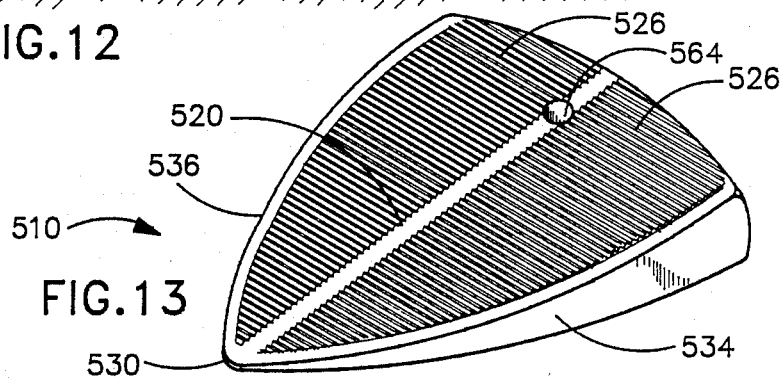

4,830,320

DEVICE FOR SUPPORTING AND STABILIZING AN ARTICLE OF FURNITURE

BACKGROUND OF THE INVENTION

The present invention is directed to a stabilizing device which is adapted to be inserted between a support surface and the lower support structure of an article of furniture in order to help support and stabilize the article of furniture against instability that is caused by an uneven structural support of the article. This instability manifests as tipping or wobbling under perturbations to the distribution of the weight on the article, jarring forces and the like. The stabilizing device thus may also be used to help level an otherwise evenly supported article on a support surface. Accordingly, the field of the present invention is directed to the levelling and stabilizing of articles of furniture and the like which rest on a support surface such as a floor in order to prevent wobbling or tipping during use.

Most articles of furniture are constructed to have a lower support structure which defines a support plane at its lowermost points. The operative or working areas of the article of furniture is then oriented in a desired manner with respect to that support plane by the support structure. For example, a typical table has a horizontal dining surface which is oriented parallel to the floor and which is supported by four downwardly depending legs. Thus, the support plane of this table is the plane defined by the free ends of the legs. However, planar geometry dictates that only three operative support points define a plane. Thus, it is necessary that the table legs be sized with great care in order to ensure that all four free ends terminate in a common plane; otherwise, the table will have instability.

Most articles of furniture are usually supported by lower support members which indeed have a number of potential support points in excess of three. These include, by way of example, articles of furniture, such as the table, above, which have four or more downwardly depending legs, articles which have horizontal runners adapted to abut the support surface and pedestal supported articles. Unless special care is taken, it is often possible that the lower support structure of these articles does not terminate in a common support plane. When this happens, the article of furniture does not have a single stable support plane but rather is subject to unwanted wobbling or tipping. Even such articles of furniture which have only three support points, such as a three legged table, that automatically define a stable support plane, it still occurs that the working surface may not be in a desired orientation due to any error in the intended length of any support.

Accordingly, there has been a long-felt need for mechanical structures and devices which can level or otherwise stabilize articles of furniture. To this end, some articles of furniture are provided with adjustable pads on their lower supports with these pads typically being threaded bolts which terminate in support pads or heads. These threaded bolts move into and out of the lower supports to define an adjustable support plane. Thus, the support pads may be threadably adjusted so that all of the common support points are in a common plane. Other techniques of levelling items such as heavy machinery include the use of a pair of freely sliding wedges which are innerconnected by means of a threaded shaft; a torque applying assembly interconnects the wedges so that they may be forceably slid with respect to one another to provide vertically adjustable supports for the machine.

Despite the existence of different levelling structures, it is still a common experience for a person to find an article of furniture, such as a table and the like, which is either not level or is not stabilized. Such inconvenient event happens commonly in restaurants, taverns and other places of social gathering. One possible reason for this inconvenience includes the fact that the majority of articles of furniture do not include any adjustable stabling structure whatsoever despite the fact of the known use of adjustable pads; this omission is possibly due to the increased cost. Even where levelling structures are present on the article of furniture they may be out of adjustment or may have been damaged through intense use. Sometimes the integrity of the support structure has, itself, been compromised through use. Hence, many persons at one time or another have found themselves utilizing an article of furniture which is unstable or is otherwise off level. This situation can jeopardize the use of the article and, indeed, the persons situated therearound, since the food items, drinks and the like can become spilled or otherwise compromised during use of the article. Further, the wobbling of a table is often very annoying for people sitting therearound since each time a person contacts the table, the table may shift.

In order to help stabilize tables and other articles of furniture, then, it is a common practice for persons in restaurants and taverns to try to use napkins, matchbook covers, coins and other devices in a vain attempt to stabilize a table or other furniture article. Accordingly, there is a need on the part of business proprietors for a simple and inexpensive device which can be used to level tables or other furniture articles in their establishments, and a need for a simple, inexpensive portable device which a person may conveniently carry in his/her pocket in order to stabilize a table. These needs for such a simple and inexpensive stabilizing device are solved by the present invention.

SUMMARY OF THE INVENTION

It is an object of the present invention to provide a novel and useful device for use with articles of furniture which device can be placed between a lower support portion of an article and its support surface in order to prevent the article of furniture from wobbling, tipping and the like.

It is another object of the present invention to provide an inexpensive device which may be used by restaurant owners and other business proprietors to level and stabilize articles of furniture without resorting to complex, expensive stabilizing structures.

Another object of the present invention is to provide a portable and lightweight device for stabilizing articles of furniture which device is small in size so that it may be used by an individual to temporarily stabilize a table or other article of furniture during use after which the person may remove it so that it may retained by the person for re-use.

A further object of the present invention is to provide a stabilizer device that has no moving parts which may be used to provide a small range of adjustment in the support, stabilization and levelling of articles of furniture.

A still further object of this invention is to provide a wedge device which may be employed as a stiff, yet flexible, stabilizing support against tipping and jarring forces.

Yet another object of the present invention is to provide a stabilizer device which includes engagement structure so that a plurality of the devices may be releaseably engaged with one another in a variety of configurations to provide a broader range of stabilizing adjustment.

In the broad form of the present invention, then, a device is provided which device is adapted for insertion between a support surface and the lower support portion of an article in order to help stabilize and position the article on a support surface. This stabilizer device includes a main body member which has an upper surface and a lower surface which have a common vertex and which diverge from one another to define a wedge-shaped configuration. A plurality of rib-like first teeth are located on one of the upper and lower surfaces with these rib-like teeth being oriented transversely to the direction of divergence of the upper and lower surfaces. Thus, the lower surface may be placed on the support surface such that the vertex defines a initial attack portion that is inserted between the support surface and the article of furniture whereby the body member is advanced until the upper surface contacts and supports the lower support structure to stabilize the article of furniture at a desired position. Thus, the thickness of the body member compensates for inconsistencies in the supports which define the support plane of the article.

Additional structure is provided for the stabilizing device according to the preferred embodiment. With greater particularity, it is desired that both of the upper and lower surfaces be provided with a plurality of rib-like teeth oriented transversely to the direction of divergence with both sets of teeth being sized to complement and engage one another. These teeth are preferably organized in pairs forming longitudinal rows on their respective upper and lower surface. With this engagement structure, a plurality of the body members may be stacked one on top of the other in a variety of configurations. The devices may be stacked either with upper surface of one body member engaging the lower surface of an adjacent body member, with the upper surface engaging another upper surface or with a lower surface engaging another lower surface. Thus, a plurality of devices may be used to obtain the desired support configuration with the teeth engaging each other to prevent relative longitudinal slippage of the adjacent stabilizer devices. The rows of teeth are flanked by longitudinal ridges which prevent lateral slippage of the devices when a plurality of devices are stacked together. To this end, also, the stabilizing devices may be formed of an anti-skid, high friction material or otherwise coated or layered with such materials.

Preferably, the stabilizing device is constructed of a relatively stiff, yet flexible material such as polypropylene or polycarbonate. Otherwise, the material may be a stiff, but compressible material which is resilient. These materials provide a resilient support to help stabilize the article of furniture against jarring or tipping forces. To this end also, the device may be constructed to have a lower open region in the body member so that the body member flexes under the weight of the article of furniture and in response to jarring forces impacting the article of furniture to further stabilize the article. In one embodiment, this open region is formed by a cavity through the lower surface to define a wall of reduced thickness between the upper support surface and the cavity to enhance the flexing of the body. In another embodiment, the open region may be constructed by configuring the lower surface as a concave surface; the upper surface, if desired, may be convex with the same radius of curvature as the lower surface. The common vertex may be formed either as a point, a line or a flattened nose portion between said upper and lower surfaces. In addition, the body member may be provided with a bore extending completely through the upper surface to the lower surface so that the stabilizing device may be retained on a typical key ring for portable retention or received on a mounting nail or peg.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 1 is a perspective view of the stabilizing device according to the preferred embodiment of the present invention in a support position between a support leg of an article of furniture and a support surface;

FIG. 2 is an enlarged perspective view of the stabilizing device shown in FIG. 1 showing the upper surface thereof;

FIG. 3 is a perspective view of the stabilizing device shown in FIG. 2 showing the lower surface thereof;

FIG. 4 is a cross-sectional view taken about lines 4—4 of FIG. 2;

FIG. 6 is an enlarged view, broken away, of the vertex attack portion of the stabilizer device shown in FIGS. 2-5;

FIG. 7 is a side view in elevation showing a pair of the preferred stabilizer devices in a first stacked configuration;

FIG. 8 is a side view in elevation showing a pair of stabilizing devices in a second stacked configuration;

FIG. 9 is a side view in elevation of a pair of stabilizing devices shown in a third stacked configuration;

FIG. 10 is a view is cross-section similar to FIG. 4, but showing the stabilizing device under the influence of weight from an article of furniture;

FIG. 11 is a side view in elevation showing a pair of stabilizing devices in a fourth configuration;

FIG. 12 is a cross-sectional view showing the stabilizing devices stacked as is shown in FIG. 11, yet under the influence of weight from an article of furniture;

FIG. 13 is a perspective view of a first alternate embodiment of a stabilizing device according to the present invention;

DETAILED DESCRIPTION OF THE PREFERRED EMBODIMENT

Figure 5:
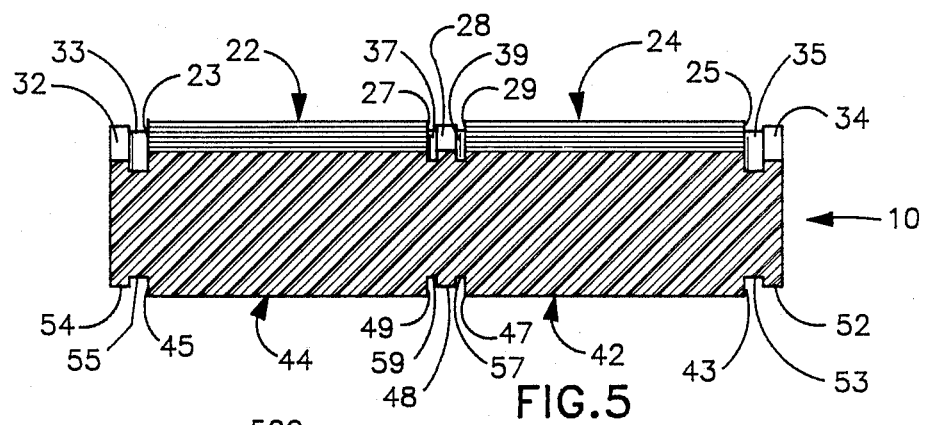
FIG. 5 is a cross-sectional view taken about lines 5—5 of FIG. 2.

The present invention is directed to a novel and useful device which is insertable between a support surface and a lower portion of an article in order to help stabilize and level an article on the support surface. It is intended that this device be of simple construction and be of inexpensive materials so that it may be used by restaurant owner and other business proprietors to quickly and easily stabilize articles of furniture, such as tables and the like, and which may be relatively portable so that a person may carry the device with him/her for temporary use and re-use.

As is shown in FIGS. 1–4, the preferred embodiment of the present invention is directed to a stabilizer device 10 which may support an article of furniture. As is shown in these Figures, stabilizing device 10 is adapted for insertion between a lower support portion of an article of furniture and the like, such as table leg 12, and a support surface 14 in order to stabilize the article of furniture against tipping, rocking or other unwanted wobbling movement. Thus, as is seen in FIG. 1, free end 16 of leg 12 rests directly on stabilizing device 10, which is, itself, positioned on support surface 14.

The structure of stabilizing device 10 is best shown in FIGS. 2–5. Stabilizing device 10 has a main body which includes an upper surface 20 and a lower surface 40 which have a common vertex 30 and are outwardly divergent from one another from vertex 30 to an end surface 50 to define a direction of divergence as is shown by arrow D. First and second sidewalls 36 and 38 extend between upper surface 20 and lower surface 40.

As is best shown in FIG. 2, upper surface 20 is preferably formed as a flat plane and is provided with two rows 22 and 24 of first rib-like teeth 26. Teeth 26 are formed as pairs of first teeth with each pair being oriented along a common line on either side of a central flat portion 28 which forms part of upper surface 20 On either side of rows 22 and 24 are also located flat portions 32 and 34, respectively, with flat portions 28, 32 and 34 being coplanar. Thus, teeth 26 project upwardly above upper surface 20.

As is best shown in FIG. 3, lower surface 40 is also provided with two rows 42 and 44 of second teeth 46. Again, second teeth 46 are rib-like teeth which extend transversely to the direction of divergence and are organized as pairs of linear teeth on either side of a central flat portion 48. Additional flat portions 52 and 54 are located on the outside edges of teeth 46, so that flat portion 52 is adjacent an outer edge of row 42 with flat portion 54 being adjacent an outer edge of row 44 of teeth 46. Flat portions 48, 52 and 54 are coplanar with one another to define lower surface 40 such that second teeth 46 project outwardly of lower surface 40.

A cavity 56 is formed in lower surface 40 so that it has a bottom 58. As is shown in FIG. 4, cavity 58 opens outwardly of lower surface 40 and defines a wall 60 of reduced thickness between upper support surface 20 and cavity 56. This wall of reduced thickness forms an open region which is formed at a lower end of stabilizing device 10 when lower surface 40 is placed on a support surface, such as support surface 14. A bore 64 is formed completely through the main body of device 10, from upper surface 20 to lower surface 40, and is located adjacent end surface 50. This bore 64 forms a carrying and mounting hole for device 10.

It should be appreciated from the foregoing that stabilizing device 10 thus is defined by a body member which has upper surface 20, lower surface 40, end surface 50 and a pair of side surfaces 36 and 38. These surfaces are constructed to define a wedge-shaped configuration having an attack vertex defined by the line of intersection of the upper and lower surfaces. Accordingly, stabilizing device 10 may be inserted between a support surface and an article to be supported. Stabilizing device 10 is preferably formed by injection molding with a high friction material which is operative to prevent slippage once it is inserted between the lower support structure of the article of furniture and the support surface. Preferably, stabilizing device 10 is constructed of a relatively stiff, yet flexible, material and may be a plastic material selected from a group consisting of polypropylene and polycarbonate. Other materials known in the art are contemplated by this invention although these are the preferred materials. Indeed, and although not shown in the drawings, stabilizing device 10 could be constructed of any material that may then either be layered or coated with a thin film of high friction material, again as is known in the art.

In use, then, as is shown in FIGS. 1 and 10, stabilizing device 10 is adapted for insertion between a leg support 12 and a support surface 14. To this end, vertex 30 defines an attack portion of the wedge-shaped body portion that forms stabilizing device 10 for initial insertion, for example, between free end 16 of leg 12 and support surface 14. Stabilizing device 10 is slid under leg 12 with lower surface 40 contacting support surface 14. At the desired degree of stabilization, upper surface 20 of stabilizing device 10 contacts free end 16 of leg 12 so as to provide wedged support for leg 12. As is best shown in FIG. 9, cavity 56 defines an open region and, with the reduced thickness of wall 60, allows a small amount of flexing so that upper surface 20 will have a deformed concave region 62. Therefore, the body member flexes under the weight of the article of furniture and in response to jarring forces impacting the article of furniture; this further stabilizes the article. This function may also be accomplished by constructing stabilizing device 10 out of a relatively stiff but compressible material.

As is shown in FIG. 6, first teeth 26 and second teeth 46 are formed similarly to each other, each having an equilaterally triangular cross-section. End surface 50 is oriented at a right angle with respect to lower surface 40 and at a large acute angle with respect to upper surface 20 which large acute angle is the complimentary angle to angle $\phi$ which corresponds to the angle of divergence of surfaces 20 and 40. Preferably, angle $\phi$ is selected to be within a range of 10° to 20°, inclusive. Thus, since surface 20 is slightly longer in the direction of the divergence as is lower surface 40, first teeth 26 are slightly offset from second teeth 46 to accommodate this difference as is shown in FIG. 5. It should further be appreciated that each of first teeth 26 are symmetric about a line perpendicular to first surface 20, such as line A, shown in FIG. 5. Likewise, each of second teeth 46 is oriented perpendicularly to lower surface 40 such as depicted by perpendicular line B, also in FIG. 5.

It should be now appreciated that upper surface 20 and lower surface 40 complement each other so that a plurality of stabilizing devices 10 and 110 may be stacked, one on top of the other, in a variety of configurations. Thus, respective teeth 26 and teeth 46 engage one another to prevent relative longitudinal slippage of adjacent ones of stabilizing devices 10. For example, as is shown in FIG. 7, a stabilizing device 10 has an upper support surface 20 carrying teeth 26. A second stabilizing device 110 may be stacked on stabilizing device 10 so that its upper surface 120 engages upper surface 20.

To this end, teeth 126 of device 110 directly engage teeth 26 so that a generally rectangular support is provided by the stacking of the two stabilizing devices as is shown in this FIG. 7. Thus, lower surface 140 is provided to support the article of furniture. Cavity 156 is upwardly opening and cavity 56 is downwardly opening with lower surface 40 being adapted to be placed on the support surface.

Should a wedge-shaped body having a larger degree of divergence be desired, a pair of stabilizing devices 10 and 210 may be stacked, as is shown in FIG. 8. To this end, lower surface 240 of device 210 engages upper surface 20 of device 10 so that second teeth 246 of device 210 engage first teeth 26 of device 10. It can be appreciated that the stacking such that vertex 30 is adjacent vertex 230 forms a wedge-shaped body that has twice the degree of divergence as the single device.

As is shown in FIG. 9, a pair of devices 10 and 310 can also be stacked such that a lower surface 340 of device 310 engages an upper surface 20 of device 10 with teeth 346 engaging teeth 26. This configuration is similar to that shown in FIG. 7 except that, in FIG. 9, both of cavities 56 and 356 open downwardly whereas, in FIG. 6, cavity 56 opens downwardly with cavity 156 opening upwardly. It should further be appreciated that, with respect to FIGS. 7-9, any desired arrangement of stacking is possible since surfaces, such as surfaces 20 and 40, complement one another. Additional stabilizing devices may be added, in any desired configuration of stacking, as should be readily understood, in order to increase the thickness and shape of the set of stabilizing devices. This accommodates larger degrees of difference in sizing of the lower support surfaces of various articles of furniture.

Also, where a plurality of devices 10 are desired to be stacked, it is preferred to provide structure to prevent lateral slippage of the devices. To this end, the advantage of forming both rib teeth 26 into rows 22 and 24 and rib teeth 46 into rows 42 and 44 may now be more fully appreciated. With reference to FIG. 5, it may be seen that a channel 33 is formed adjacent the outer edge 23 of row 22, and a channel 35 is formed adjacent the outer edge 25 of row 24. Flat portion 28 is flanked by a pair of parallel channels 37 and 39 which are respectively adjacent inner edges 27 and 29 of rows 22 and 24. On lower surface 40, a channel 53 is formed adjacent outer edge 43 of row 42, and a channel 55 is formed adjacent the outer edge 45 of row 44. Flat portion 48 is flanked by a pair of parallel channels 58 and 59 which are respectively adjacent inner edges 47 and 49 of rows 42 and 44. Thus, flat portions 28, 32, 34, 48, 52 and 54 define longitudinal ridges on their respective upper and lower surfaces 20 and 40. When a plurality of devices 10 are stacked together, the edges 23, 25, 27, 29, 43, 45, 47 and 49 will abut respective ones of these longitudinal ridges to prevent lateral slippage. It may thus be seen that teeth 26 are sunken with respect to flat portions 28, 32 and 34 on the level of portions 33, 35, 37 and 39, but the teeth 26 extend upwardly above surfaces 28, 32 and 34. Likewise teeth 46 are sunken with respect to flat portions 48, 52 and 54 on the level portions 43, 45, 47 and 49, but the teeth 46 extend above surfaces 48, 52 and 54.

Should a stabilizing device having a greater longitudinal length be desired, two or more stabilizing devices may be offset with one another as is shown in FIG. 11. Here, stabilizing device 10 is offset from a second stabilizing device 410. This configuration is similar to FIG. 9 except that only a first portion 412 of lower surface 440 engages a first portion 66 of upper surface 20 of device 10. This configuration also allows for additional flexing under the weight of an article of furniture, such as shown in FIG. 12. Here, such stacked configuration allows stiff, but flexible and resilient bending in region 412 in order to accommodate the weight of the article of furniture and jarring forces.

Figure 14:
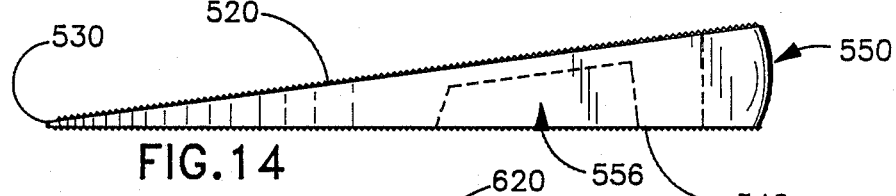
FIG. 14 is a side view in elevation of the stabilizing device shown in FIG. 13.

In addition to the preferred embodiment to the present invention shown in FIGS. 1-12, several alternate embodiments of the present invention are shown in FIGS. 13-17. A first alternate embodiment is shown in FIGS. 13 and 14. Here, stabilizing device 510 has an upper surface 520 and a lower surface 540 diverge from one another. In this configuration, however, endwall 550 is curved and sidewalls 534 and 536 taper together from endwall 550 to form a single point vertex 530. Similarly to the preferred embodiment shown in FIGS. 1-12, stabilizing device 510 is provided with a plurality of first teeth 526 oriented transversely to the direction of divergence on upper surface 520, and a second set of teeth 546 on lower surface 540, with teeth 546 also being oriented transversely to the direction of divergence of surfaces 520 and 540 Bore 564 then extends through the main body of stabilizing device 10 at a central location adjacent end surface 550. Again, a cavity 556, shown in phantom, is provided.

Figure 15:
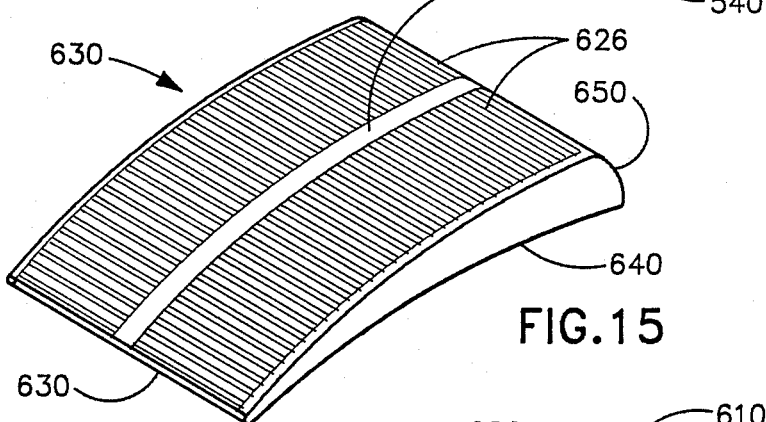
FIG. 15 is a perspective view of a second alternate embodiment of the stabilizer device according to the present invention.
Figure 16:
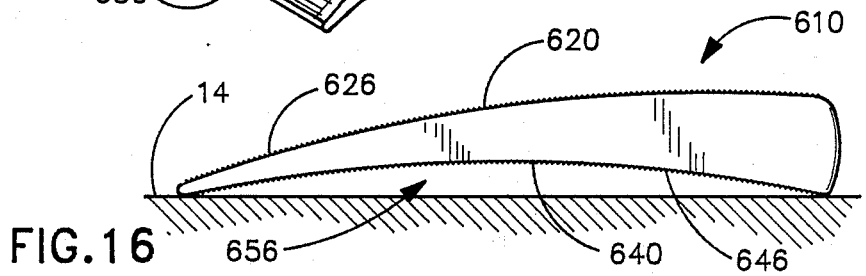
FIG. 16 is a side view in elevation showing the stabilizing device of FIG. 15.

A second alternate embodiment of the present invention is shown in FIGS. 15 and 16. Here, stabilizing device 610 includes an upper surface 620 that is provided with transverse rib-like first teeth 626 which extend completely across surface 620 in a lateral direction. A lower surface 640 intersects surface 620 at a vertex formed by a line of intersection 630 but diverges from surface 620 to an end surface 650. Surface 640 is provided with a plurality of rib-like teeth 646 which extend completely across surface 620 in a direction transverse to the direction of divergence. It may be appreciated from reviewing FIG. 16 that surfaces 640 and 620 have a common radius of curvature with surface 620. While, in the preferred embodiment, planar surfaces 20 and 40 may be deemed to have a common, infinite radius of curvature, the upper surface 620 of this second alternate embodiment is convex while surface 640 is concave. Thus, surfaces 620 and 640 complement one another so that a plurality of stabilizing devices 610 may be stacked, one on top of the other. In this case, however, it is necessary that a lower surface 640 always abut and engage an upper surface 620 of an adjacent stabilizing device 610. Furthermore, when positioned on a support surface 14, the concave nature of surface 640 forms an open region 656 which allows a small degree of flexing of stabilizing device 610. Thus, open region 640 defined by concave surface 640 functions in a manner similar to the flexing accomplished by cavity 56 described with respect to the preferred embodiment.

Figure 17:
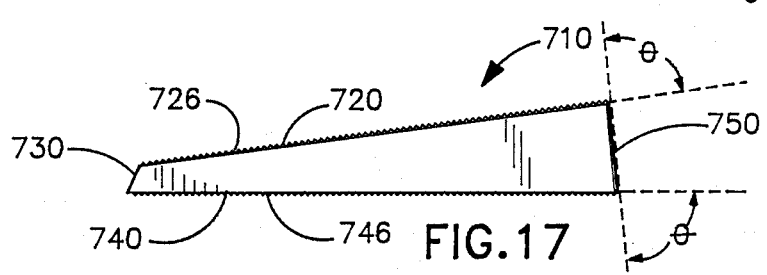
FIG. 17 is a side view in elevation showing a third alternate embodiment of the stabilizing device according to the present invention.

A third alternate embodiment of the present invention is shown in FIG. 17. Here, stabilizing device 710 has an upper surface 720 and a lower surface 740 which diverge from one another by a vertex formed as a flattened nose portion 730 to an end surface 750. Here, however, surface 750 is oriented at a common, large acute angle $\theta$ with respect to both surfaces 720 and 740. Again, teeth 726 are formed on surface 720 and teeth 746 are formed on lower surface 740 in a manner similar to that with respect to he preferred embodiment.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A device adapted for insertion between a support surface and the lower support structure of an article of furniture placed thereon in order to help stabilize the article of furniture, comprising a body member formed of a relatively stiff, yet flexible material in a shape having an upper surface and a lower surface which have a common vertex and which diverge from one another to define a wedge-shaped configuration, said body member having a plurality of rib-like first teeth located on said upper surface and a cavity formed in the lower surface, said teeth oriented transversely to the direction of divergence of said upper and lower surfaces whereby said lower surface may be placed on said support surface with the common vertex defining an initial attack portion for insertion between the support surface and the article of furniture whereby said body member may be advanced until said upper surface contacts and supports the lower support structure to stabilize the article of furniture whereby said body member flexes under the weight of the article of furniture and in response to jarring forces impacting the article of furniture to further stabilize said article.

2. A stabilizing device according to claim 1 wherein said upper and lower surfaces have a common radius of curvature and including a plurality of rib-like second teeth located on the other one of said upper and lower surfaces and oriented transversely to the direction of divergence, said second teeth sized to complement and engage said first teeth whereby a plurality of said body members may be stacked one on top of the other with the upper surface of one body member engaging the lower surface of an adjacent body member with at least some of the respective first and second teeth thereon engageing one another.

3. A stabilizing device according to claim 2 wherein said radius of curvature is infinite so that said upper and lower surfaces are planar whereby a plurality of said body members may be stacked one on top of the other with a lower surface engaging either an upper or lower surface of an adjacent body member and an upper surface engaging either an upper or lower surface of an adjacent body member.

4. A stabilizing device according to claim 2 wherein said lower surface is concave and said upper surface is convex.

5. A stabilizing device according to claim 2 including means for prohibiting lateral slippage of said plurality of body members when stacked one on top of the other.

6. A stabilizing device according to claim 5 wherein said means for prohibiting lateral slippage is defined by longitudinal ridges flanking said first and second teeth whereby said edges of said first and second teeth will abut said ridges to prevent lateral movement.

7. A stabilizing device according to claim 1 wherein said material is plastic selected from a group consisting of polypropylene and polycarbonate.

8. A stabilizing device according to claim 1 wherein said material is resilient and compressible.

9. A stabilizing device according to claim 1 wherein said material is a high friction material operative to prevent slippage of the body member once it is inserted between the lower support structure of the article of furniture and the support surface.

10. A stabilizing device according to claim 1 whereby said cavity creates a wall of reduced thickness between the upper support surface and the cavity to enhance deformation of the body member about said wall.

11. A stabilizing device according to claim 1 wherein the lower surface of said body member is coated with a high friction material operative to prevent slippage of the body member once it is inserted between the lower support structure of the article of furniture and the support surface.

12. A stabilizing device according to claim 1 wherein said vertex is formed as a point of intersection of the upper and lower surfaces.

13. A stabilizing device according to claim 1 wherein said vertex is a line of intersection of the upper and lower surfaces.

14. A stabilizing device according to claim 1 wherein said vertex is a flattened nose portion between said upper and lower surfaces.

15. A stabilizing device according to claim 1 wherein said body member has a bore formed completely therethrough from the upper surface to the lower surface.

16. A device adapted for insertion between a support surface and the lower support structure of an article of furniture and the like placed thereon and operative to support and stabilize said article, comprising a main body member element and formed of a relatively stiff, yet flexible and resilient material, said body member having an upper surface and a lower surface having a common vertex and a common radius of curvature, said upper and lower surfaces divergently extending in a direction of divergence from said vertex, said body member having an end surface extending between said upper and lower surfaces at a location opposite said vertex and a pair of side surfaces extending between said upper and lower surfaces on opposite sides thereof, said upper surface provided with a plurality of first ribs formed transversely to the direction of divergence and said lower surface provided with a plurality of second ribs formed transversely to the direction of divergence, said vertex defining an attack portion for said wedge-shaped element whereby the device may be inserted between the support surface and the lower support structure and advanced until the upper and lower surfaces contact the support surface and the lower support structure to stabilize the article, said body member having a longitudinal channel and a longitudinal ridge structure on each side of said first ribs and on each side of said second ribs with said first and second ribs sized to fit with one another and are operative such that a plurality of devices may be stacked with the teeth on adjacent facing ones of said upper and lower surfaces engaged and with side edges of engaged ones of the teeth abutting respective ridge structures whereby both longitudinal and lateral slippage is prevented.

17. A device according to claim 16 wherein said upper and lower surfaces are planar.

18. A device according to claim 16 wherein said upper surface is convex and said lower surface is concave.

19. A device according to claim 16 including a cavity formed in the lower surface to create a wall portion of reduced thickness between said cavity and the upper surface which is operative to enhance flexing of the body member.

20. A device according to claim 16 wherein said first ribs are organized as two rows of ribs defining first pairs of ribs coextensive with one another and one member of each first pair being located on either side of a first central flat portion of said upper surface, and wherein said second ribs are organized as two rows of ribs defining second pairs of ribs coextensive with one another and one member of each second pair being located on either side of a second central flat portion of said lower surface, there being channel and ridge structure flanking each respective row of ribs.

21. A device according to claim 16 wherein said first ribs are offset in relation to said second ribs relative to said vertex.

22. A device according to claim 16 wherein said first and second ribs have a cross-section in the form of an equilateral triangle, each being oriented perpendicularly to its respective upper and lower surface.

23. A device according to claim 16 wherein said end surface is perpendicular to one of said upper and lower surfaces.

24. A device according to claim 16 wherein said end surface is oriented equiangularly with respect to said upper and lower surfaces.

25. A device according to claim 16 wherein said side surfaces are arcuately divergent from one another.

* * * * *